Feb. 14, 1967 R. C. BROWN 3,303,978
COLLAPSIBLE ARTICLE CARRIER
Filed Nov. 15, 1965 3 Sheets-Sheet 1
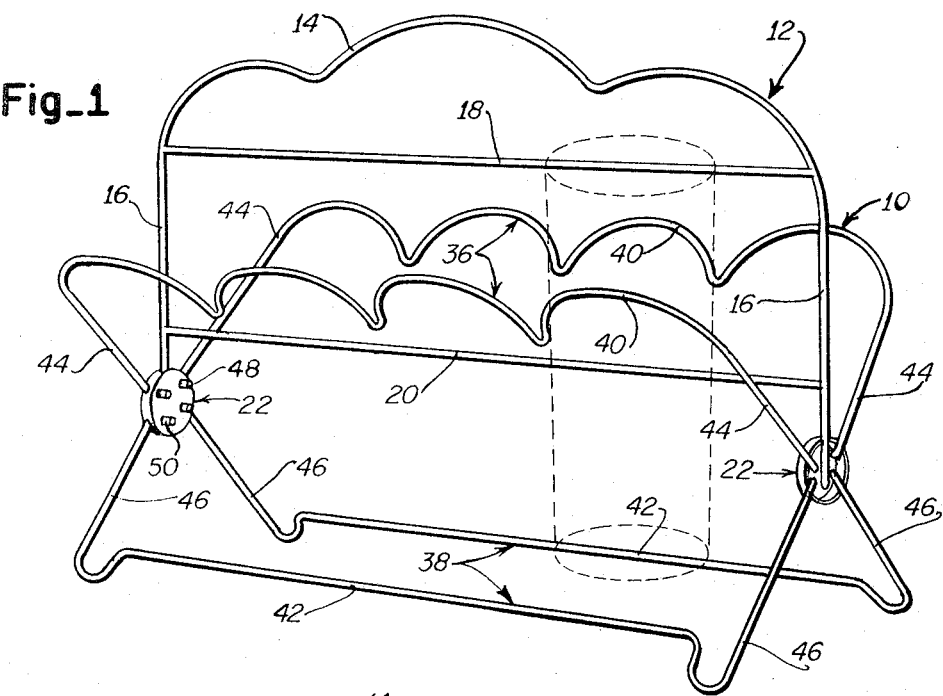
Fig_1
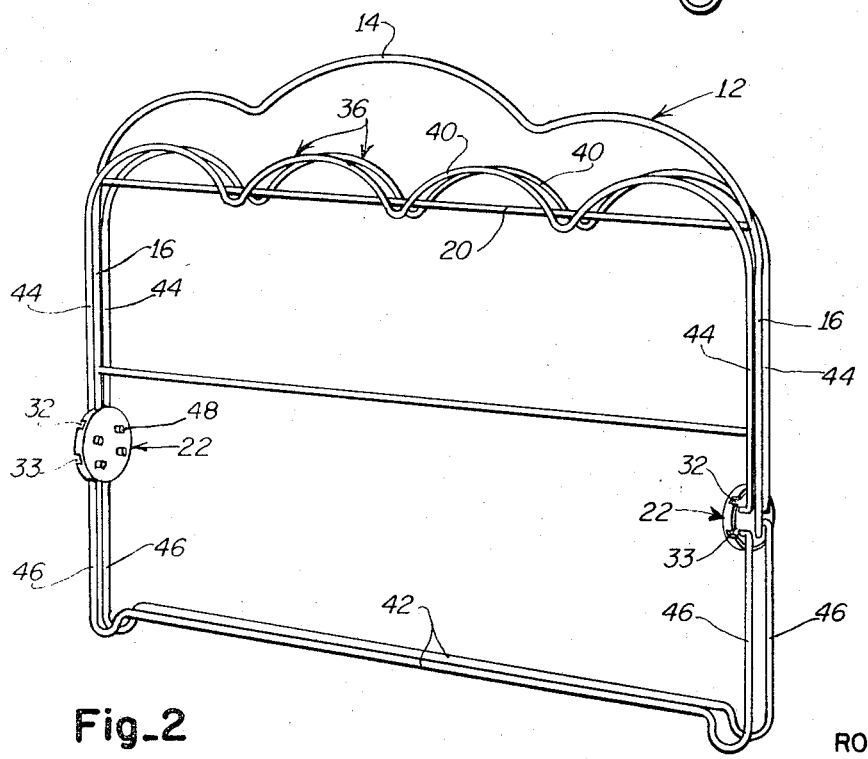
Fig_2
INVENTOR
ROY C. BROWN
BY McCormick, Paulding & Huber
ATTORNEYS

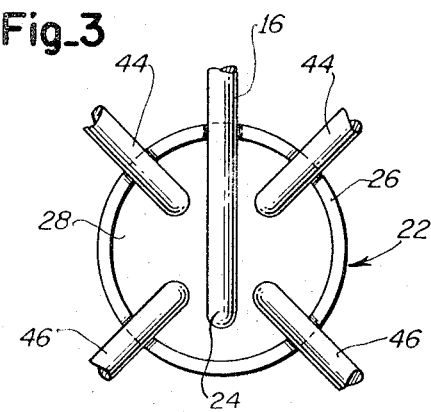
Fig_3
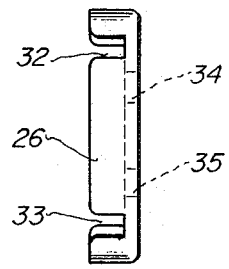
Fig_7
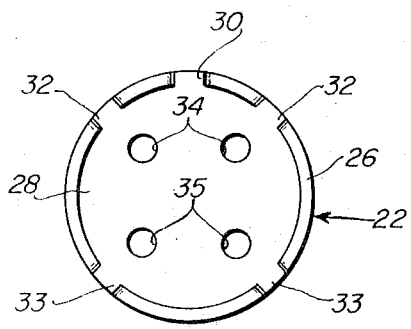
Fig_5
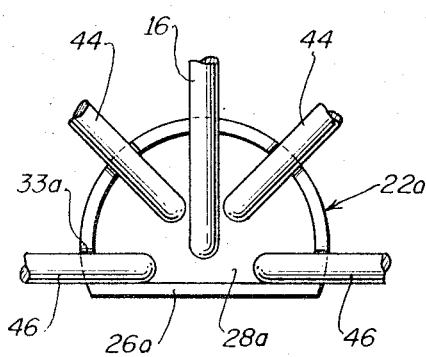
Fig_6
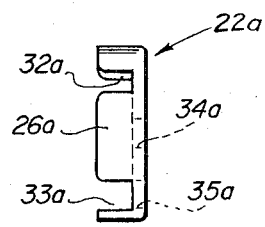
Fig_8

Feb. 14, 1967   R. C. BROWN   3,303,978
COLLAPSIBLE ARTICLE CARRIER
Filed Nov. 15, 1965   3 Sheets-Sheet 3
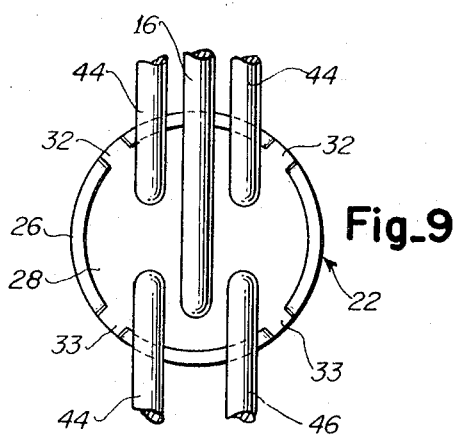
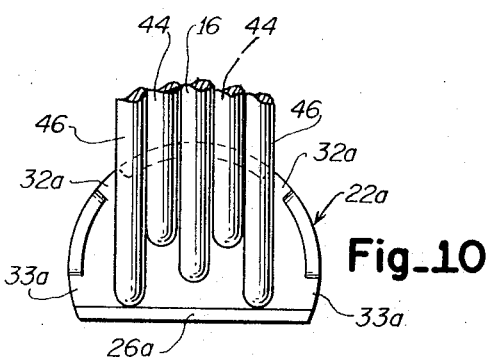
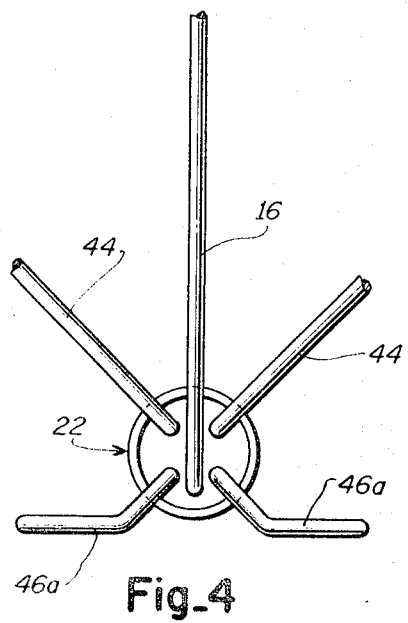
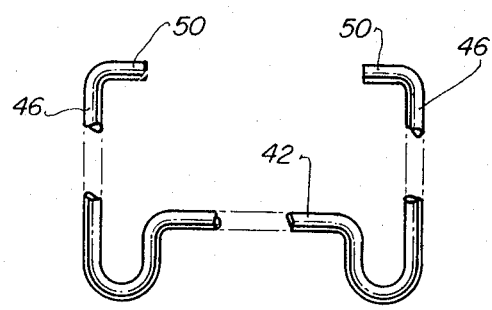
INVENTOR
ROY C. BROWN
BY
McCormick, Paulding & Huber
ATTORNEYS United States Patent Office 3,303,978
Patented Feb. 14, 1967

3,303,978
COLLAPSIBLE ARTICLE CARRIER
Roy C. Brown, Rte. 169, Canterbury, Conn. 06331
Filed Nov. 15, 1965, Ser. No. 507,813
4 Claims. (Cl. 224—45)

This invention relates to a collapsible carrier and more particularly to a collapsible carrier for carrying articles such as glass tumblers or the like.

It is the general object of the present invention to provide a collapsible carrier which may be constructed of formed-wire elements including side and base members, which may be folded into and out of article carrying position, which is provided with means to receive and to secure the side and base members in a predetermined relative position with respect to each other for carrying a plurality of articles such as glass tumblers, and which may also be folded into space-saving, storage position.

It is a further object of the invention to provide a carrier which is durable, lightweight, inexpensive and adapted for mass production manufacturing methods.

Other objects and advantages of the present invention will become more readily apparent from the following description and drawings which show a preferred embodiment of the invention, and such embodiment will be described; but it will be understood that various changes and modifications may be made from the construction disclosed and that the drawings and description are not to be construed as defining or limiting the scope of the invention, the claims forming a part of the specification being relied upon for that purpose.

In the drawings:

FIG. 1 is a perspective view of the carrier of the present invention shown with the side and base members in article-carrying position.

FIG. 2 is a perspective view of the carrier of FIG. 1 but shown with the side and base members folded into storage position.

FIG. 3 is an enlarged, fragmentary, end elevational view of the carrier showing the socket member supporting the side and base members in open position thereon.

FIG. 4 is a side elevational view of the carrier of the present invention illustrating another form of base member used in connection therewith.

FIG. 5 is an elevational front view of the socket member shown in FIG. 3.

FIG. 6 is a view similar to FIG. 3 but showing another form of socket member used with my improved carrier.

FIGS. 7 and 8 are end elevational views of the socket members shown in FIGS. 3 and 6 respectively.

FIGS. 9 and 10 are views similar to FIGS. 3 and 6 but showing the side and base members folded into the storage position.

FIG. 11 is an elevational view showing portions of the base member of the carrier shown in FIGS. 1 and 2.

Referring to the drawings, my improved carrier, generally indicated by the numeral 10, includes a handle member 12 of generally U-shaped configuration, preferably formed from a length of wire or the like bent to provide a body portion 14 disposed between spaced-apart, co-planar legs 16, 16, as best shown in FIG 1 of the drawing. The handle member 12 is also provided with upper and lower parallel stiffening members 18 and 20 which extend between and are secured to the legs 16, 16 intermediate the body portion 14 and the ends of the legs 16, 16. The stiffening members 18 and 20 are co-planar with the legs 16, 16 and provide rigidity to the handle.

A socket member 22 is secured to the terminal end portion 24 of each of the legs 16 and is preferably formed of a metal stamping bent to provide an extending flange 26 surrounding the peripheral edge portion of the body 28 thereof. The socket members are welded or otherwise suitably affixed to the ends 24, 24 of the legs 16, 16 as shown, in opposed alignment thereon with the flange 26 of each extending outwardly, and preferably with the body 28 of each lying in parallel planes disposed normal to the plane containing the aforesaid co-planar legs 16, 16. A notch 30 is formed in the flange 26 of each socket 22 to receive the end 24 of each leg 16 permitting the leg to bear against the outwardly facing surface of the body 28 of the socket.

Each socket member 22 is also provided with a plurality of angularly spaced-apart, upper notches 32, 32 and lower notches 33, 33 in the flange 26, radially aligned with a corresponding number of spaced, upper openings 34, 34 and lower openings 35, 35 formed in the body 28, as best shown in FIG. 5 of the drawings. The socket members are constructed and arranged whereby they receive and support spaced side members 36, 36 disposed on opposite sides of the handle member 12 and also base members 38, 38, similarly disposed on opposite sides of the handle member 12 below the aforesaid side members in a manner which will become readily apparent.

Both the side members and base members are preferably formed of a length of resilient wire or the like and are generally U-shaped in configuration, each having a body portion 40 and 42, respectively, and opposed legs 44 and 46, respectively, spaced apart and joined by the aforesaid body portions. The free terminal end portions 48, 48 of the side members are bent inwardly as are the free terminal end portions 50, 50 of the aforesaid base members. Both the in-turned end portions 48, 48 and 50, 50 are arranged and adapted to be received within the openings 34 and 35 respectively of the socket members 22.

When the in-turned ends 48, 48 and 50, 50 of the side and base members, respectively, are disposed within the said openings, they are retained therein by the normal tension of the members which bias the legs inwardly. The in-turned end portions are constructed to be of sufficient length to be slightly greater than the edge width of the socket 22 as viewed in FIGS. 7 and 8, including both the width of the flange 26 and the thickness of the socket body 28. The spaced notches 32, 33 in the flange 26 are adapted to receive the legs 44 and 46 of the side and base members, respectively, as shown and are arranged whereby when the said legs are received therein the side and base members extend radially outwardly from the socket member, as best seen in FIG. 1, angularly spaced apart and arranged as previously stated on opposite sides of the intermediate handle member 12. Preferably the notches 32, 32 are of sufficient depth to permit the legs 44 and 46 to abut the body 28 of the socket 22.

It is readily apparent that with the side and base members so disposed within, and retained by, the sockets 22, articles to be carried within my improved carrier may be placed therein between the side and handle members, and resting upon the body 42 of the base member. For purposes of illustration, I have shown my carrier arranged and constructed for supporting and carrying a plurality of glass tumblers or the like. The body portions 40, 40 of the side members 36, 36 have, therefore, been bent to form a plurality of curvilinear portions, each such curved portion being adapted to receive a glass tumbler 52 and to embrace the sides thereof. It will be noted that by forming the side members in this fashion each glass tumbler (shown in broken lines in FIG. 1) is therefore spaced from the adjacent tumbler which effectively reduces the probability of breakage. It is also to be noted from FIG. 1 that the glass tumblers are shown with their bases resting upon and being supported by the body portion 42 of the base member 38. In addition to providing rigidity to the intermediate handle member 12, the stiffeners 18 and 20 also serve to separate articles placed in the carrier, positioning and spacing them on opposite sides of the handle member 12, effectively preventing their accidentally falling between the body members 42, 42 of the base members 38, 38.

It is obvious that the carrier of the present invention may be adapted for use with articles of various sizes. By increasing or decreasing the angular spacing of the notches 32 in the flange 26 relative to the notch 30 within which the terminal end portion 24 of the leg 16 of the handle member is secured, the spacing between the intermediate handle 12 and the body portions 40 and 42 of the side and base members, respectively, may be correspondingly increased or decreased whereby the carrier will accept larger or smaller articles. Similarly, additional spaced notches may be provided initially in the flange 26 whereby the side and base members may be adjustable into several article receiving positions. It will be noted, however, that in all positions of the base members 38, 38 relative to their respective side members 36, 36, the body 42 of each base member is disposed below a side member 36 intermediate the body 40 thereof and the plane containing the legs 16, 16 and stiffeners 18 and 20 of the intermediate handle 12.

For storing my improved carrier, it will be seen from FIG. 2 of the drawings that both the side and base members may be folded out of article-carrying position whereby the carrier may be stored in substantially flat condition. By pulling outwardly on the legs 44 and 46 of the side and base members, respectively, they may be readily disengaged from their respective notches 32 and 33, without, however, disengaging the in-turned terminal end portions 48 and 50 thereof from their respective openings 34 and 35. When disengaged from the notches, the side and base members are easily rotated into the position shown in FIG. 2 of the drawings whereby they lie in planes substantially adjacent to and parallel to the plane containing the handle member 12.

FIG. 4 of the drawing illustrates an alternate form of base member provided with legs 46a, 46b bent whereby a portion thereof, including the body portion 42, are adapted to engage the supporting surface for the carrier. This form of base member is especially suited for use when it is intended that the carrier will be used primarily for articles of relatively lower height than the tumblers 52, shown in the drawings.

In FIGS. 6 and 8 of the drawings, an alternate form of socket member 22a is shown in which the lower openings 35a are spaced outwardly of the upper openings 34a relative to the leg portion 24 and the handle 12. Also the lower portion of the body 28a of the socket 22a is relieved as shown to permit the socket and the adjacent portion of the flange 26a extending therefrom to lie flat on the surface supporting the carrier. It will be noted that the lower openings 35a and lower notches 33a are disposed adjacent to the relieved portion of the body 28a whereby a portion of each of the legs 46 of the base members 42 will bear against the portion of the flange 26a extending from the relieved portion of the body 28a. It can be seen that use of this form of socket member permits the base members 38 to extend outwardly from the plane containing the handle member 12 substantially normal thereto whereby the legs 46 and body portions 42 of the base members 38 will be supported for substantially their entire length by a flat surface supporting the carrier.

It is obvious that use of the alternate forms shown in FIGS. 4 and 6 are likewise readily adapted to permit the base and side members to be folded into storage position as shown in either FIGS. 2, 9 or 11.

The invention claimed is:

1. A collapsible carrier of the type having opposed article-supporting side and base members disposed on opposite sides of an intermediate handle member, each of said side and base members being of generally U-shaped configuration having spaced apart opposed legs joined by a body member extending therebetween, each of said opposed legs having inwardly directed terminal portions, socket means carried by said intermediate handle member arranged to receive said inwardly directed terminal portions to support the side and base members therefrom in article-receiving position extending outwardly from said intermediate handle member, and means associated with said socket means to releasably retain said side and base members in article-receiving position and operative to permit said members to be rotated out of article-receiving position and into storage position whereby the said side and base members are disposed adjacent to the plane containing said intermediate handle member.

2. A collapsible carrier according to claim 1 wherein the said socket means comprises a body portion having an extending flange surrounding the periphery thereof, said body portion being formed with a plurality of openings therein adapted to receive the said inwardly directed terminal portions of the legs and notch means in said flange arranged to releasably receive the legs of the side and base members to cooperate with the said openings to receive and releasably retain the side and base members in article-receiving position.

3. A collapsible carrier according to claim 2 wherein the said inwardly directed terminal end portions are arranged and constructed to co-act with the said openings when the said legs of the side and base members are released from the notches in the flange permitting the said and base members to be rotated about said socket means out of article-receiving position into storage position.

4. A collapsible carrier according to claim 2 wherein the intermediate handle member is generally U-shaped having coplanar, spaced apart legs joined by a body member extending therebetween, said socket means being affixed to and carried by each of the legs of the handle member, the body portion of each socket being generally disk-shaped having the lower edge thereof defined by a chord, extending normal to the plane of the handle member, at least two of said openings and notches being disposed adjacent to said lower edge of each socket to receive the base members whereby they will extend outwardly from the handle member substantially normal to the plane thereof when in article-receiving position.

References Cited by the Examiner

UNITED STATES PATENTS 2,049,884  8/1936  Wurster et al.

FOREIGN PATENTS 481,795  3/1952  Canada.

GERALD M. FORLENZA, *Primary Examiner.*

F. E. WERNER, *Assistant Examiner.*